United States Patent [19]
Oppitz et al.

[11] Patent Number: 5,601,165
[45] Date of Patent: Feb. 11, 1997

[54] ROTARY ACTUATOR, A ROTARY ACTUATOR IN A MOTOR VEHICLE SUSPENSION, AND A METHOD OF MASS PRODUCING ROTARY ACTUATORS

[75] Inventors: Horst Oppitz, Dittelbrunn; Stefan Schiffler, Schonungen; Bernhard Schmitt, Wasserlosen, all of Germany

[73] Assignee: Fichtel & Sachs AG, Schweinfurt, Germany

[21] Appl. No.: 331,115

[22] Filed: Oct. 28, 1994

[30] Foreign Application Priority Data

Nov. 5, 1993 [DE] Germany ............ 43 37 768.8

[51] Int. Cl.[6] ............ F03C 4/00; B60G 21/055; F04C 9/00
[52] U.S. Cl. ............ 188/296; 92/125; 280/689
[58] Field of Search ............ 280/689, 723; 180/293, 294, 296, 307; 92/125, 128; 188/296

[56] References Cited

U.S. PATENT DOCUMENTS

| | | | |
|---|---|---|---|
| 3,053,236 | 9/1962 | Self et al. | 92/125 |
| 3,276,332 | 10/1966 | Jaffe | 92/125 |
| 3,277,796 | 10/1966 | Wessel et al. | 92/125 |
| 5,332,236 | 7/1994 | Kastuhara et al. | 92/125 |

FOREIGN PATENT DOCUMENTS

| | | |
|---|---|---|
| 1191154 | 4/1965 | Germany . |
| 4229025 | 3/1994 | Germany . |

*Primary Examiner*—Matthew C. Graham
*Attorney, Agent, or Firm*—Nils H. Ljungman and Associates

[57] ABSTRACT

A rotary actuator has a cylinder and a motor shaft as well as end caps which define a working area. A number of ribs extend from the inside wall surface of the cylinder and an equal number of vanes extend from the outside shell surface of the motor shaft. The ribs and vanes divide the working area into working chambers which are alternately supplied with hydraulic medium. Seals are disposed in grooves in the ribs and the vanes, which seals are braced between the inside wall surface of the cylinder or the outside shell surface of the motor shaft and the respective groove base, so that the seals hydraulically separate the working chambers from one another. The outside shell surface of the motor shaft and the inside wall surface of the cylinder are designed with recesses, so that the prestress on the seals is neutralized in at least one installation position of the motor shaft. The rotary actuator can be used in a stabilizer bar of a motor vehicle suspension system. The recesses make assembly of the actuator conducive to a method of mass production.

20 Claims, 6 Drawing Sheets

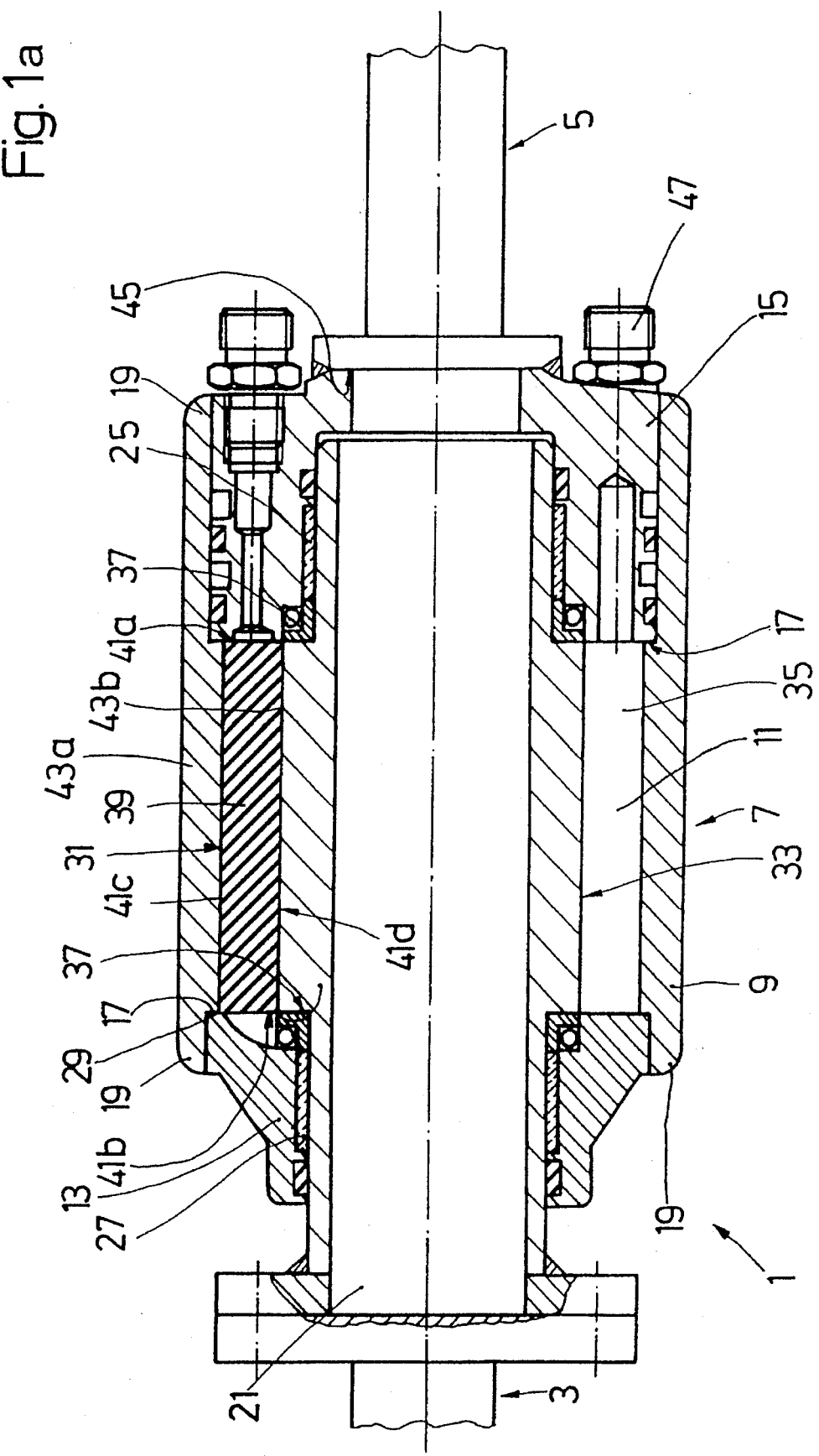

ROTARY ACTUATOR, A ROTARY ACTUATOR IN A MOTOR VEHICLE SUSPENSION, AND A METHOD OF MASS PRODUCING ROTARY ACTUATORS

CROSS REFERENCE TO RELATED APPLICATIONS

This Application is related to several co-pending applications which are directed to rotary actuators and have applicants in common with the present Application. The related co-pending applications are as follows: Ser. No. 08/330908, filed Oct. 28, 1994 entitled "Rotary actuator with stabilizer in a motor vehicle suspension system"; Ser. No. 08/330934, filed Oct. 28, 1994 entitled "Stabilizer system for a motor vehicle suspension system with a rotary actuator"; Ser. No. 08/331042, filed Oct. 28, 1994 entitled "Rotary actuator such as a hydraulic rotary actuator for a motor vehicle and a method of making a rotary actuator"; Ser. No. 08/331045, filed Oct. 28, 1994 entitled "A rotary actuator such as a rotary actuator for a motor vehicle suspension"; Ser. No. 08/331048, filed Oct. 28, 1994 entitled "A hydraulic rotary actuator such as a rotary actuator for a motor vehicle suspension, and a method for assembling the rotary actuator"; Ser. No. 08/360434 filed Oct. 28, 1994 entitled "Anti-roll vehicular suspension system and a hydraulic rotary actuator system in an anti-roll vehicular suspension system".

BACKGROUND OF THE INVENTION

1. Field of the Invention

The present invention generally relates to a rotary actuator, a rotary actuator in a motor vehicle suspension, and a method of mass producing rotary actuators.

2. Background Information

German Patent Application No. 42 29 025.2 discloses a rotary actuator for which the installation conditions with respect to the seals in the vanes and ribs are essentially unfavorable for large-scale series production. Currently, the seals braced between the groove base and the inside surface of the cylinder or the outside surface of the motor shaft can essentially only be installed by complex, expensive and time-consuming manual work, since the seals must generally be threaded in carefully to prevent damage. The seal can essentially only be tested when the rotary actuator is closed, however, so that a seal which was damaged during installation, and which represents major damage because of its high cost, can essentially only be replaced by completely dismantling the rotary actuator, which can be a time-consuming and expensive process.

OBJECT OF THE INVENTION

An object of the present invention is to eliminate the problems associated with known arrangements at the lowest possible cost, so that economical large-scale series production becomes possible.

SUMMARY OF THE INVENTION

To achieve this object, the present invention teaches that the outside shell surface of the motor shaft and the inside wall surface of the cylinder can preferably be designed in such a manner that the prestress on the seals can be relieved in at least one installation position of the motor shaft. The risk of damage to the cylinder associated with known arrangements can thus be eliminated or very greatly reduced or minimized.

In one embodiment of the present invention, the installation position is preferably located in at least one range of angular rotation which is outside the usual angle of rotation of the operating range. This can prevent the occurrence of a constant change of the prestress during the normal operation of the rotary actuator, which can lead to accelerated wear of the seals or to leaks between the working or operating chambers.

It is very advantageous for installation if the installation position can be defined so that it is suitable for automated fabrication and is easily producible. As a result of such a measure, the installation position is preferably reached when the ribs of the cylinder and the vanes of the motor shaft come into contact.

It is also advantageous that the outside shell surface of the motor shaft and the inside wall surface of the cylinder preferably have one radial recess for each seal in the vicinity of the installation position of the rotary actuator, so that the radial distance between the groove base and the outside shell surface of the motor shaft or the inside wall surface of the cylinder is equal to or greater than the height of the seal. The recess can be fabricated essentially very easily during the machining of the inside wall surface of the cylinder or the outside shell surface of the motor shaft. The tolerances for the recess can be very generous. In any case, the shape of the recess can be relatively unimportant as long as the seal is not under prestress. The recess includes a base surface which is preferably connected via a transition surface to that part of the inside wall surface or the outside shell surface of the motor shaft which represents the normal operating range of the rotary actuator.

The assembly of the rotary actuator can be particularly simple and can preferably include the following sequence of actions: the cylinder is provided with an end cap, the motor shaft is inserted into the cylinder, the motor shaft is twisted into an installation position for the seal, the seals are inserted into the grooves of the vanes and ribs, the rotary actuator is closed by means of an additional end cap, and the motor shaft is twisted into the normal operating range. The costly and complex installation of the seals required by known arrangements has essentially been eliminated. The seals are essentially not exposed to any potentially damaging actions. The steps in the process should be simple enough that automatic fabrication is possible.

It should be understood that when the word "invention" is used in this application, the word "invention" includes "inventions," that is, the plural of "invention." By stating "invention," applicant does not in any way admit that the present application does not include more than one patentably and non-obviously distinct invention, and maintains the possibility that this application may include more than one patentably and non-obviously distinct invention. The applicant hereby asserts that the disclosure of this application may include more than one invention, and, in the event that there is more than one invention, that these inventions may be patentable and non-obvious, one with respect to the other.

One aspect of the invention resides broadly in a rotary actuator comprising: shaft apparatus; cylinder apparatus; the shaft apparatus being at least partially surrounded by at least a portion of the cylinder apparatus; a longitudinal axis being disposed through the shaft apparatus; at least one of the shaft apparatus and the cylinder apparatus being rotatable about the longitudinal axis; the shaft apparatus comprising an outer wall surface; at least a portion of the outer wall surface being disposed a substantial distance from the longitudinal axis; the cylinder apparatus comprising an inner wall surface; at least a portion of the inner wall surface being disposed about and towards the outer wall surface; at least a portion of the inner wall surface being disposed substantially concentric with respect to at least a portion of the outer wall surface; at least one of: a) the shaft apparatus outer wall surface and b) the cylinder apparatus inner wall surface, comprising at least one projection projecting between the outer wall surface and the inner wall surface; a seal; the at least one projection comprising a groove for receiving the seal; the seal being disposed in the groove; the seal providing a sealing function for sealing a fluid between the outer wall surface and the inner wall surface; the other of the at least one of the shaft apparatus outer wall surface and the cylinder apparatus inner wall surface comprising at least one recess; the at least one recess being disposed and dimensioned to accept the seal and facilitate removal of at least the seal.

Another aspect of the invention resides broadly in a process for the assembly of a rotary actuator, the rotary actuator comprising: shaft apparatus; cylinder apparatus; the shaft apparatus being at least partially surrounded by at least a portion of the cylinder apparatus; a longitudinal axis being disposed through the shaft apparatus; at least one of the shaft apparatus and the cylinder apparatus being rotatable about the longitudinal axis; the shaft apparatus comprising an outer wall surface; at least a portion of the outer wall surface being disposed a substantial distance from the longitudinal axis; the cylinder apparatus comprising an inner wall surface; at least a portion of the inner wall surface being disposed about and towards the outer wall surface; at least a portion of the inner wall surface being disposed substantially concentric with respect to at least a portion of the outer wall surface; at least one of: a) the shaft apparatus outer wall surface and b) the cylinder apparatus inner wall surface, comprising at least one projection projecting between the outer wall surface and the inner wall surface; a seal; the at least one projection comprising a groove for receiving the seal; the seal being disposed in the groove; the seal providing a sealing function for sealing a fluid between the outer wall surface and the inner wall surface; the other of the at least one of the shaft apparatus outer wall surface and the cylinder apparatus inner wall surface comprising at least one recess; the at least one recess being disposed and dimensioned to accept the seal and facilitate removal of at least the seal; the process of assembly comprising: providing the shaft apparatus; providing the cylinder apparatus; providing the at least one projection; providing the at least one groove; providing the at least one seal; providing the at least one recess; configuring the shaft apparatus and cylinder apparatus to undergo a limited angle of rotation with respect to one another during operation of the rotary actuator, the limited angle of rotation representing an operating range of movement of the rotary actuator; the process of assembly further comprising: inserting the at least one seal into the at least one groove; inserting the shaft apparatus into the cylinder apparatus and aligning the at least one projection with at least one recess; twisting the shaft apparatus into the operating range of the rotary actuator within the limited angle of rotation.

Yet another aspect of the invention resides broadly in a process for the mass production of rotary actuators, each rotary actuator comprising: shaft apparatus; cylinder apparatus; the shaft apparatus being at least partially surrounded by at least a portion of the cylinder apparatus; a longitudinal axis being disposed through the shaft apparatus; at least one of the shaft apparatus and the cylinder apparatus being rotatable about the longitudinal axis; the shaft apparatus comprising an outer wall surface; at least a portion of the outer wall surface being disposed a substantial distance from the longitudinal axis; the cylinder apparatus comprising an inner wall surface; at least a portion of the inner wall surface being disposed about and towards the outer wall surface; at least a portion of the inner wall surface being disposed substantially concentric with respect to at least a portion of the outer wall surface; at least one of: a) the shaft apparatus outer wall surface and b) the cylinder apparatus inner wall surface, comprising at least one projection projecting between the outer wall surface and the inner wall surface; a seal; the at least one projection comprising a groove for receiving the seal; the seal being disposed in the groove; the seal providing a sealing function for sealing a fluid between the outer wall surface and the inner wall surface; the other of the at least one of the shaft apparatus outer wall surface and the cylinder apparatus inner wall surface comprising at least one recess; the at least one recess being disposed and dimensioned to accept the seal and facilitate removal of at least the seal; the process of mass production comprising the following steps with respect to each rotary actuator: providing the shaft apparatus; providing the cylinder apparatus; providing the at least one projection; providing the at least one groove; providing the at least one seal; providing the at least one recess; configuring the shaft apparatus and cylinder apparatus to undergo a limited angle of rotation during operation of the rotary actuator, the limited angle of rotation representing an operating range of movement of the rotary actuator; the process of mass production further comprising the following steps with respect to each rotary actuator: inserting the at least one seal into the at least one groove; inserting the shaft apparatus into the cylinder apparatus and aligning the at least one projection with at least one recess; twisting the shaft apparatus into the operating range of the rotary actuator within the limited angle of rotation.

BRIEF DESCRIPTION OF THE DRAWINGS

The invention and its primary advantages are described in greater detail below with reference to the accompanying drawings.

FIG. 1a is substantially the same view as FIG. 1, but more detailed.

DESCRIPTION OF THE PREFERRED EMBODIMENT

Figure 1:
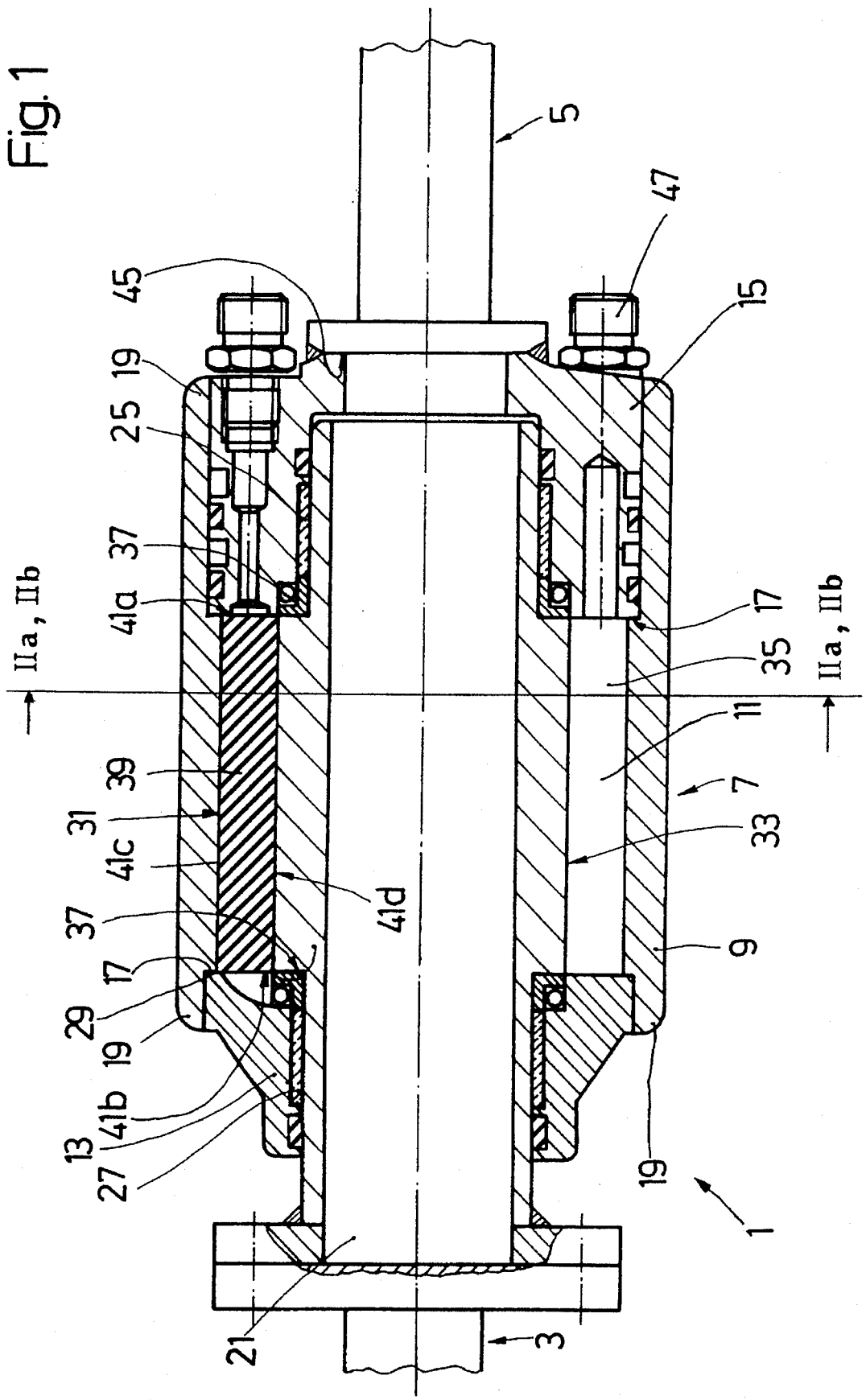
FIG. 1 schematically illustrates a rotary actuator in longitudinal section.

As an example for the application of a rotary actuator, FIG. 1 shows a section of a stabilizer system 1 which includes a divided stabilizer, with the stabilizer parts 3 and 5 and a rotary actuator 7. For reasons of simplicity, the ends of the stabilizers connected to the respective wheel bearings are not shown.

The rotary actuator preferably includes, among other things, a cylinder 9 with ribs 11 running axially on its inside diameter. The ribs 11 and the cylinder 9 are preferably realized as an integral unit. An end cap 13 and an end cap 15 on the two ends of the cylinder 9 can preferably define a working area. The positioning of the end caps 13 and 15 within the cylinder can preferably be determined by the end surfaces 17 of the ribs 11. There is preferably a weld seam 19 in the terminal regions of the rotary actuator 21 between the end caps 13 or 15 and the cylinder 9.

A motor shaft 21 is preferably mounted in the working area by means of friction bearings 25, 27 in such a manner that the shaft can rotate. The motor shaft 21 has a number of vanes 29 on its outside diameter which preferably have the same axial orientation as the ribs 11 of the cylinder 9. The ribs 11 and the inside wall surface 31 of the cylinder 9, as well as the vanes 29 and the outside shell surface 33 of the motor shaft 21, form working chambers 35a, 35b. The working chambers 35a, 35b (shown in FIG. 2a) are preferably sealed on the one hand by means of angular joint gaskets 37 at the base of the vanes 29 between the end caps 13, 15. The end faces of the vanes 29 and the ribs 11 are preferably sealed by means of seals 39 so that there can be a hydraulic separation between the adjacent working chambers 35a, 35b. The seals 39 preferably provide the seal by means of their end faces 41a–41d and at least one side wall 43a, 43b (shown in FIG. 1a). When installed, the operating pressure within the working area preferably increases the static prestress on the seals 39 and preferably provides dynamic sealing.

The cap 15 is preferably equipped with a first hydraulic connection 45 and a second 47 hydraulic connection which are preferably oriented parallel to the principal axis of the rotary actuator 7. Each of the two hydraulic connections 45, 47 can be directly connected to one of the working chambers 35a, 35b. In addition, an interconnection system preferably forms a connection between the working chambers 35a, 35b with essentially the same indexing, whereby the interconnected working chambers 35a, 35b of the first hydraulic connection 45 preferably alternate with the working chambers 35b of the second hydraulic connection 47. Interconnection systems between the working chambers of a rotary actuator are well known so are not described or shown in further detail. However, examples of interconnection systems can be found in Federal Republic of Germany published Patent Application No. 42 29 025.2, specifically FIG. 2 and FIG. 3.

FIG. 1a is essentially the same view as FIG. 1, but additionally shows side walls 43a and 43b.

Figure 2A:
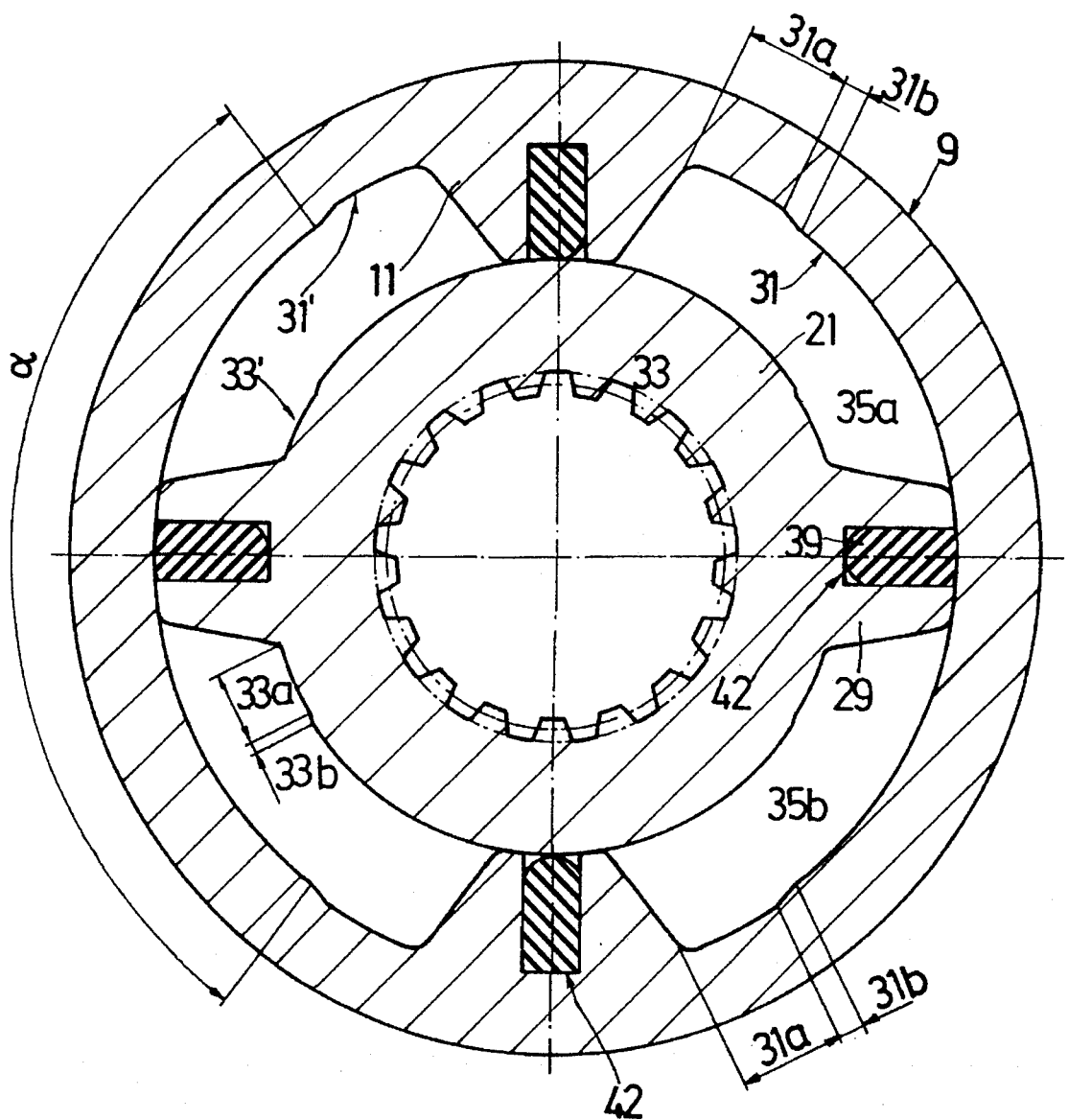
FIGS. 2a and 2b schematically illustrate a detail of the vicinity of the recesses for the seals.
Figure 2B:
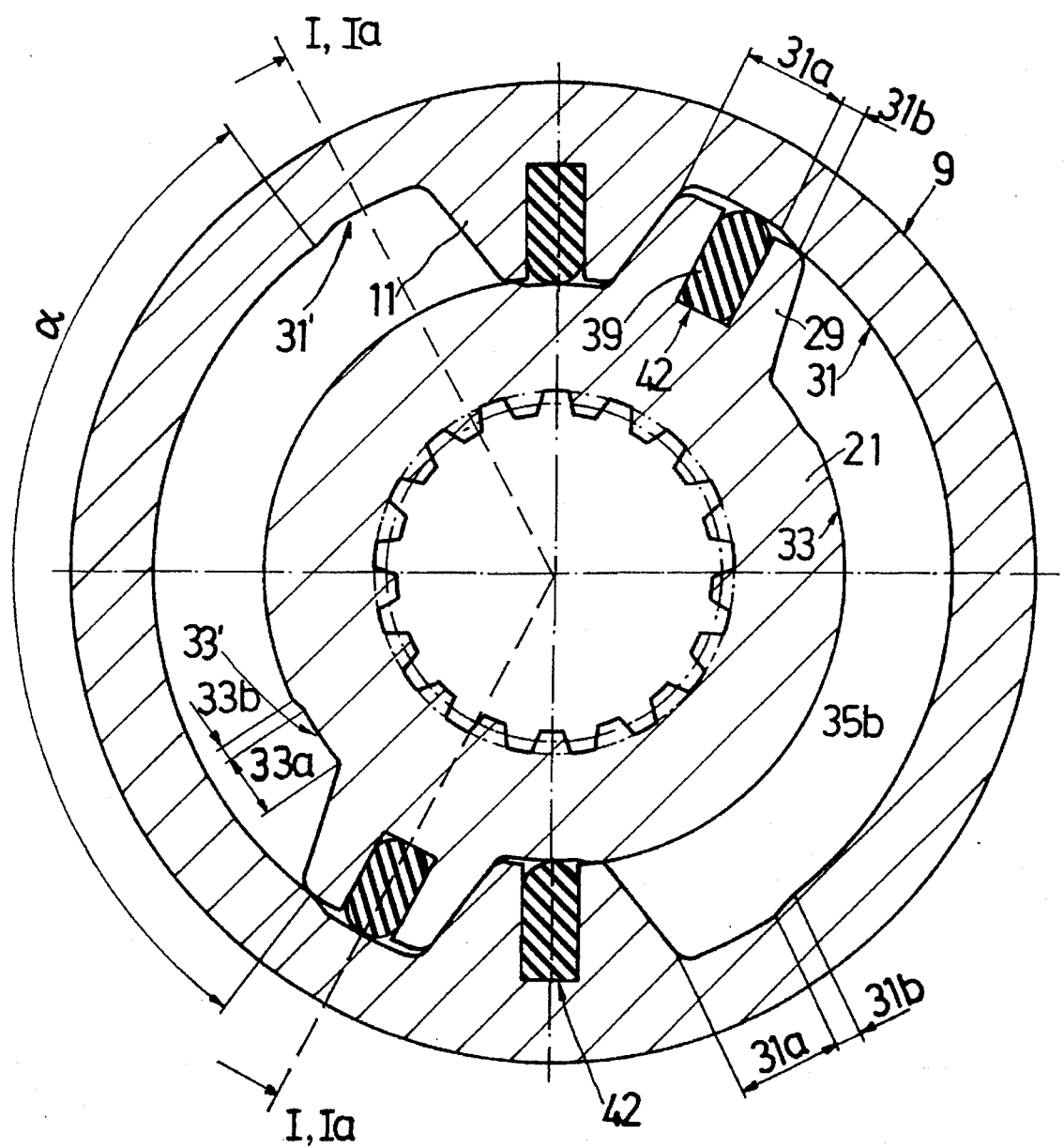

FIGS. 2a and 2b show a cross-section through the rotary actuator 7 in the vicinity of the vanes 29 or ribs 11. Inside the vanes 29 and ribs 11, the seals 39 are preferably enclosed in grooves 42. In FIG. 2a, the motor shaft 21 is in the starting position within the normal rotary angle range α (alpha). The rotary angle range α (alpha) is preferably determined by the pump capacity relative to the stabilizer. In this rotary angle range, the seals 39 are preferable prestressed by the groove 42 and the inside wall surface 31 or the outside shell surface 33. Outside the rotary angle range α (alpha), recesses 31', 33' have been worked into the inside wall surface 31 and the outside shell surface 33. The recesses include a base surface 31a, 33a preferably connected via a transition surface 31b, 33b to the inside wall surface 31 or the outside shell surface 33. The geometric configuration of the base surface can be varied with relative freedom, as long as the seal 39 inside the recess 31', 33' remains essentially free of prestress. The transition surfaces 31b, 33b ensure that the prestress preferably increases continuously to the predetermined level, thereby essentially preventing damage to the seal 39.

In FIG. 2b, the motor shaft 21 is shown twisted in the installation or removal position in the cylinder 9. In at least one direction of rotation, the ribs 11 and the vanes 29 preferably come into contact. This position can essentially easily be defined in a manufacturing robot. Each of the seals 39 is preferably located in the vicinity of a recess 31', 33' and is under no prestress. The seals 39 can be easily installed and removed.

The cylinder 9 is preferably equipped with an end cap 13 (shown in FIG. 1). The motor shaft 21 is then preferably inserted and the vanes 29 of the shaft are brought into contact with the ribs 11 of the cylinder. The seals 39 are preferably installed in this position. The rotary actuator is then preferably closed by means of the second end cap 15 (shown in FIG. 1). Finally, the motor shaft 21 is preferably twisted into its normal rotary angle range α (alpha).

Figure 3:
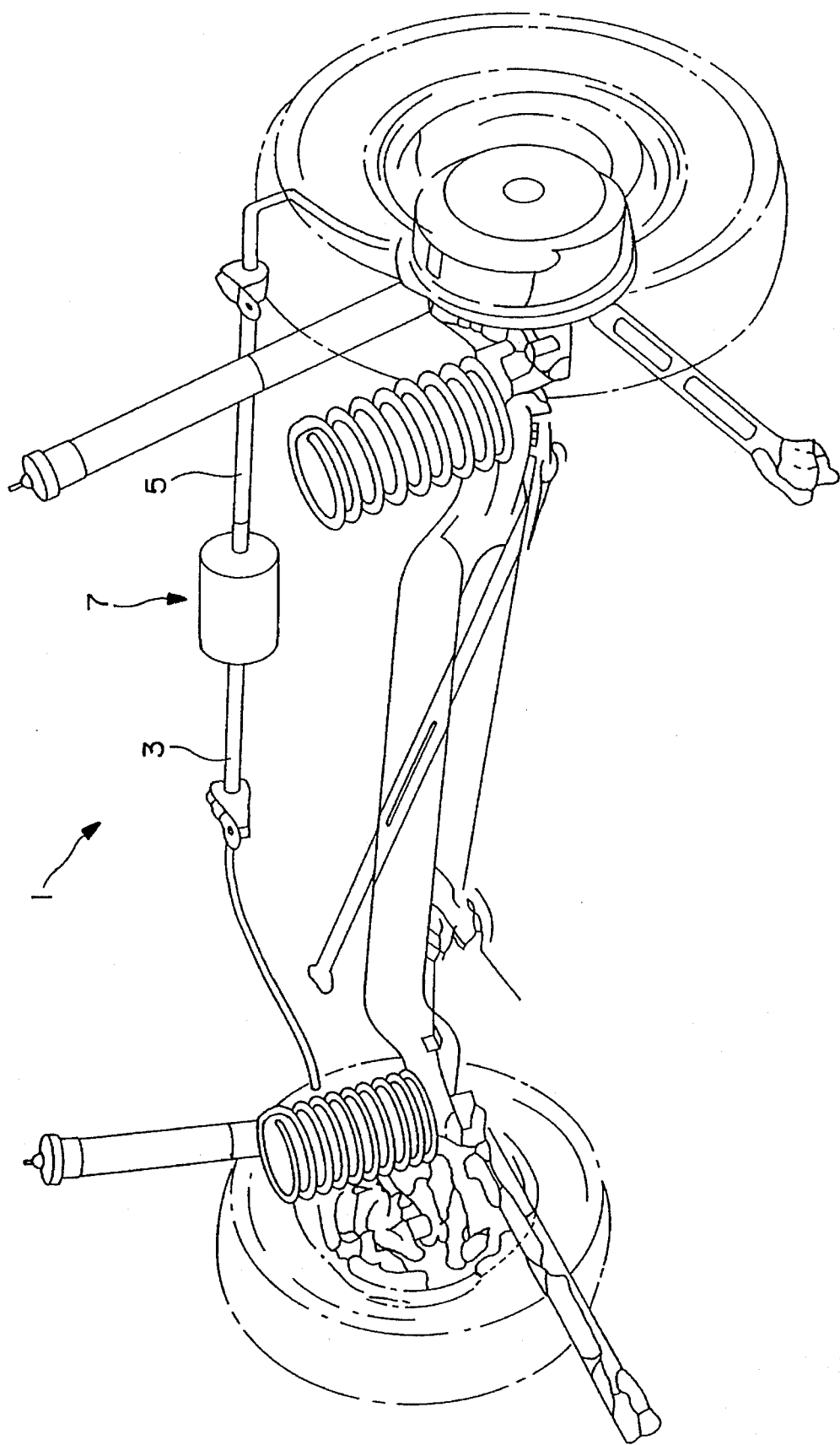
FIG. 3 illustrates a rotary actuator in an automobile suspension.

FIG. 3 shows the location of the rotary actuator 7 in the stabilizer system 1 of an automobile suspension. The cylinder 9 is preferably attached to the stabilizer bar 5, and the motor shaft 21 is preferably attached to the stabilizer bar 3.

Figure 4:
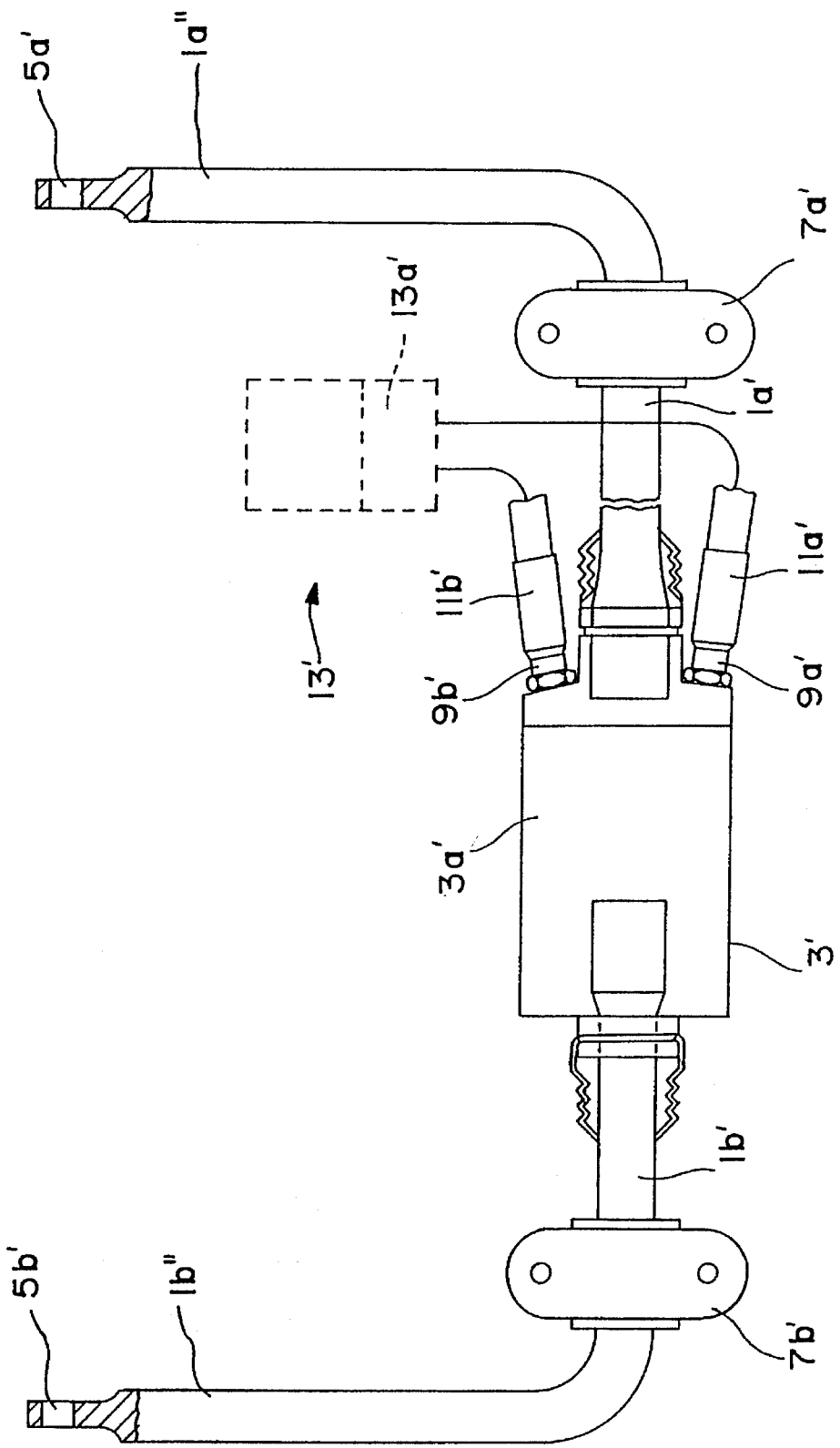
FIG. 4 further illuistrates a rotary actuator in an automobile suspension.

An application of the present invention is illustrated in FIG. 4 which represents a stabilizer 1a, 1b with a rotary actuator 3'. On the angled ends 1a", 1b" here are preferably locators 5a', 5b' in which the wheel bearings are engaged, which wheel bearings are not shown in the figure for purposes of simplicity. The stabilizer 1a', 1b' is preferably fastened to the vehicle by means of articulated clips 7a', 7b'.

The rotary actuator 3' essentially includes a rotary actuator housing 3a' and a rotary actuator vane assembly, which vane assembly is not shown in the figure, whereby the rotary actuator housing 3a' is preferably non-rotationally connected to the stabilizer part 1a', and the rotary actuator vane assembly is preferably non-rotationally connected to the stabilizer part 1b'. In the event of uneven deflection of the vehicle springs, the rotary actuator 3' can be rotated by means of a hydraulic system 13' to exert a torsional moment on the stabilizer parts 1a', 1b', so that the torsional moment moves the angled ends 1a" and 1b" to oppose the uneven deflection of the vehicle springs.

The rotary actuator 3' has two hydraulic connections 9a', 9b' which preferably form a connection to a hydraulic system 13' via the hydraulic lines 11a', 11b', whereby the hydraulic system preferably includes a hydraulic valve 13a', among other things. The components of the hydraulic system 13' can be permanently installed in the vehicle so that with each deflection of the vehicle springs or stabilizer movement, there can be a relative movement of the hydraulic lines 11a', 11b' with respect to the hydraulic system 1', which: movement must preferably be compensated for by the hydraulic hoses 11a', 11b' together with the hydraulic connections 9a', 9b'.

One feature of the invention resides broadly in the rotary actuator, comprising a cylinder and a motor shaft as well as end caps which define a work area, a number of ribs on the inside wall surface of the cylinder and an equal number of vanes on the outside shell surface of the motor shaft divide the work area into work chambers which are alternately supplied with hydraulic medium, seals or gaskets inside grooves in the ribs and vanes, which seals are braced between the inside wall surface of the cylinder or the outside shell surface of the motor shaft and the respective groove base, and hydraulically separate the work chambers from one another, characterized by the fact that the outside shell surface 33 of the motor shaft 21 and the inside wall surface 31 of the cylinder 9 are designed in such a manner that the prestress of the seals 39 is relieved in at least one installation position of the motor shaft 21.

Another feature of the invention resides broadly in the rotary actuator characterized by the fact that the installation position lies in at least one range of the angle of rotation which is outside the usual angular rotary operating range α (alpha).

Yet another feature of the invention resides broadly in the rotary actuator characterized by the fact that the installation position is reached when the ribs 11 of the cylinder 9 and the vanes 29 of the motor shaft 21 come into contact.

Still another feature of the invention resides broadly in the rotary actuator characterized by the fact that the outside shell surface 33 of the motor shaft 21 and the inside wall surface 31 of the cylinder 9 in the vicinity of the installation position of the rotary actuator 7 have at least one radial recess 31', 33' for each seal 39, so that the radial distance between the groove base and the outside shell surface 33 of the motor shaft 21 or the inside wall surface 31 of the cylinder 9 is equal to or greater than the height of the seal 39.

A further feature of the invention resides broadly in the rotary actuator characterized by the fact that the recess 31', 33" consists of a base surface 31a, 33a which is connected by means of a transition surface 31b, 33b to that part of the inside wall surface 31 or the outside shell surface 33 of the motor shaft 21 which represents the normal operating range α (alpha) of the rotary actuator 7.

Another feature of the invention resides broadly in the process for the installation or assembly of a rotary actuator characterized by the fact that the cylinder 9 is provided with an end cap 13, the motor shaft 21 is inserted into the cylinder 9, the motor shaft 21 is twisted into an installation position for the seal 39, the seals 39 are inserted into the grooves 42 of the vanes 29 and the ribs 11, the rotary actuator 7 is closed with the other end cap 15, the motor shaft 21 is twisted into the normal operating range α (alpha).

Some types of automobile suspension systems that could be utilized in accordance with the rotary actuator motor may be or are disclosed by the following U.S. Patents: U.S. Pat. No. 5,178,406 to Reynolds, entitled "Torsion Bar Suspension"; U.S. Pat. No. 5,286,059 to Tabe, entitled "Height Control System when Vehicle Is Jacked Up"; U.S. Pat. No. 5,288,101 to Minnett, entitled "Variable Rate Torsion Control System for vehicle Suspension"; and U.S. Pat. No. 5,290,048 to Takahashi and Yamashita, entitled "Working Fluid Circuit for Active Suspension Control System of Vehicle".

Some types of rotary actuators that could be utilized in accordance with the present invention may be or are disclosed by the following U.S. Patents: U.S. Pat. No. 5,332,236 to Kastuhara et al., entitled "Sealing Mechanism for a Rotary Actuator"; U.S. Pat. No. 5,309,816 to Weyer, entitled "Rotary Actuator with External Bearings"; U.S. Pat. No. 5,267,504 to Weyer, entitled "Rotary Actuator with Annular Fluid Coupling Rotatably Mounted to Shaft"; and U.S. Pat. No. 5,310,021 to Hightower, entitled "Motor-driven, Spring-returned Rotary Actuator".

The seals 39 shown in FIG. 1, FIG 1a, FIG. 2a, and FIG. 2b are preferably elastic or resilient, and the seals 39 are also preferably elastomeric and/or polymeric. Some types of seals that could be utilized with the present invention may be or are disclosed by the following U.S. Patents: U.S. Pat. No. 5,321,964 to Lovell et al., entitled "External Seal Device for Tube Hydroforming"; U.S. Pat. No. 5,250,607 to Comert et al., entitled "Moisture Cured Elastomeric Interpenetrating Network Sealants"; U.S. Pat. No. 5,259,737 to Kamisuki et al., entitled "Micropump with Valve Structure"; U.S. Pat. No. 5,234,194 to Smith, entitled "Seal for a Shaft"; and U.S. Pat. No. 5,190,299 to Johnston, entitled "Radially Undulating Shaft Seal".

The corresponding foreign patent publication applications, namely, Federal Republic of Germany Patent Application No. P 43 37 768.8, filed on Nov. 5, 1993, having inventors Horst Oppitz, Stefan Schiffler and Bernhard Schmitt, and DE-OS P 43 37 768.8 and DE-PS P 43 37 768.8, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A sealing arrangement in a rotary actuator comprising:

cylinder means having at least two inwardly radially extending opposed ribs;

shaft means rotatable about a confined arc within the cylinder means, said shaft means including at least two radially extending opposed vanes, each of said ribs and vanes including a longitudinal groove and a longitudinally extending seal within each groove;

said cylinder means comprising a longitudinally extending recess in an interior wall of the cylinder means on at least one side of each rib, said recesses being adjacent to the ribs;

said shaft means including longitudinally extending shaft recesses on at least one side of each vane, said shaft recesses being adjacent to the vanes;

each of said seals being radially compressed between said shaft means and said cylinder means during operation of the rotary actuator; and each of said recesses and said shaft recesses being dimensioned to correspond to the thickness of each seal and being dimensioned to relieve at least a portion of the compression of each seal.

2. The sealing arrangement of claim 1, wherein:

the confined arc about which said shaft means rotates comprises a working range of motion during operation of the rotary actuator; and said recesses and said shaft recesses are disposed to relieve at least a portion of the compression of each seal upon said actuator being outside of said working range of motion.

3. The sealing arrangement of claim 2, wherein:

said shaft means comprises outside surface means for radially compressing said seals within said grooves of said ribs during operation of said actuator; and said shaft means comprises a sloped transition surface connecting each of said recesses to said shaft outside surface means.

4. The sealing arrangement of claim 2, wherein:

said interior wall of said cylinder means comprises inside surface means for radially compressing said seals within said grooves of said vanes during operation of said actuator; and said cylinder means comprises a sloped transition surface connecting each of said recesses to said cylinder inside surface means.

5. The sealing arrangement of claim 4, wherein:

said shaft means comprises outside surface means for radially compressing said seals within said grooves of said ribs during operation of said actuator; and said shaft means comprises a sloped transition surface connecting each of said recesses to said shaft outside surface means.

6. The sealing arrangement of claim 5, wherein:

said longitudinally extending recesses are on both sides of each rib; and said longitudinally extending shaft recesses are on both sides of each vane.

7. A process for the assembly of a rotary actuator, said rotary actuator comprising: cylinder means having at least two inwardly radially extending opposed ribs; shaft means rotatable about a confined arc within the cylinder means, said shaft means including at least two radially extending opposed vanes, each of said ribs and vanes including a longitudinal groove and a longitudinally extending seal within each groove; said cylinder means comprising a longitudinally extending recess in an interior wall of the cylinder means on at least one side of each rib, said recesses being adjacent to the ribs; said shaft means including longitudinally extending shaft recesses on at least one side of each vane, said shaft recesses being adjacent to the vanes; each of said seals being radially compressed between said shaft means and said cylinder means during operation of the rotary actuator; and each of said recesses and said shaft recesses being dimensioned to correspond to the thickness of each seal and being dimensioned to relieve at least a portion of the compression of each seal;

said process comprising the steps of:

aligning said vanes of said shaft means with said longitudinally extending recesses of said cylinder means;

aligning said ribs of said cylinder means with said longitudinally extending shaft recesses of said shaft means;

disposing said s haft means in said cylinder means;

disposing said Seals in said longitudinal grooves of said cylinder means and said shaft means; and rotating said shaft means in said cylinder means to radially compress said seals between said shaft means and said cylinder means.

8. The process for the assembly of a rotary actuator of claim 7, wherein:

said cylinder means comprises a first end and a second end;

said rotary actuator further comprises:
a first end cap for covering said first end of said cylinder means; and
a second end cap for covering said second end of said cylinder means;

said process further comprises the steps of:
disposing said first end cap on said first end of said cylinder means; and
disposing said second end cap on said second end of said cylinder means.

9. The process for the assembly of a rotary actuator of claim 8, wherein:

said step of disposing said first end cap on said first end of said cylinder means is performed before said step of disposing said seals in said longitudinal grooves; and said step of disposing said second end cap on said second end of said cylinder means is performed after said step of disposing said seals in said longitudinal grooves.

10. The process of claim 9, wherein:

the confined arc about which said shaft means rotates comprises a working range of motion during operation of the rotary actuator; and said recesses and said shaft recesses are disposed to relieve at least a portion of the compression of each seal upon said actuator being outside of said working range of motion.

11. The process of claim 10, wherein:

said interior wall of said cylinder means comprises inside surface means for radially compressing said seals within said grooves of said vanes during operation of said actuator; and said cylinder means comprises a sloped transition surface connecting each of said recesses to said cylinder inside surface means.

12. The process of claim 11, wherein:

said shaft means comprises outside surface means for radially compressing said seals within said grooves of said ribs during operation of said actuator; and said shaft means comprises a sloped transition surface connecting each of said recesses to said shaft outside surface means.

13. The process of claim 12, wherein:

said longitudinally extending recesses are on both sides of each rib; and said longitudinally extending shaft recesses are on both sides of each vane.

14. A process for the mass production of rotary actuators, each rotary actuator comprising: cylinder means having at least two inwardly radially extending opposed ribs; shaft means rotatable about a confined arc within the cylinder means, said shaft means including at least two radially extending opposed vanes, each of said ribs and vanes including a longitudinal groove and a longitudinally extending seal within each groove; said cylinder means comprising a longitudinally extending recess in an interior wall of the cylinder means on at least one side of each rib, said recesses being adjacent to the ribs; said shaft means including longitudinally extending shaft recesses on at least one side of each vane, said shaft recesses being adjacent to the vanes; each of said seals being radially compressed between said shaft means and said cylinder means during operation of the rotary actuator; and each of said recesses and said shaft recesses being dimensioned to correspond to the thickness of each seal and being dimensioned to relieve at least a portion of the compression of each seal;

said process comprising the steps of:

aligning said vanes of said shaft means with said longitudinally extending recesses of said cylinder means;

aligning said ribs of said cylinder means with said longitudinally extending shaft recesses of said shaft means;

disposing said shaft means in said cylinder means;

disposing said seals in said longitudinal grooves of said cylinder means and said shaft means; and rotating said shaft means in said cylinder means to radially compress said seals between said shaft means and said cylinder means.

15. The process of claim 14, wherein:

said cylinder means comprises a first end and a second end;

each rotary actuator further comprises:
a first end cap for covering said first end of said cylinder means; and
a second end cap for covering said second end of said cylinder means;

said process further comprises the steps of:
disposing said first end cap on said first end of said cylinder means; and disposing said second end cap on said second end of said cylinder means.

16. The process of claim 15, wherein:

said step of disposing said first end cap on said first end of said cylinder means is performed before said step of disposing said seals in said longitudinal grooves; and said step of disposing said second end cap on said second end of said cylinder means is performed after said step of disposing said seals in said longitudinal grooves.

17. The process of claim 16, wherein:

the confined arc about which said shaft means rotates comprises a working range for motion during operation of the rotary actuator; and said recesses and said shaft recesses are disposed to relieve at least a portion of the compression of each seal upon said actuator being outside of said working range of motion.

18. The process of claim 17, wherein:

said interior wall of said cylinder means comprises inside surface means for radially compressing said seals within said grooves of said vanes during operation of said actuator; and said cylinder means comprises a sloped transition surface connecting each of said recesses to said cylinder inside surface means.

19. The process of claim 18, wherein:

said shaft means comprises outside surface means for radially compressing said seals within said grooves of said ribs during operation of said actuator; and said shaft means comprises a sloped transition surface connecting each of said recesses to said shaft outside surface means.

20. The process of claim 19, wherein:

said longitudinally extending recesses are on both sides of each rib; and said longitudinally extending shaft recesses are on both sides of each vane.

* * * * *

UNITED STATES PATENT AND TRADEMARK OFFICE
CERTIFICATE OF CORRECTION

PATENT NO. : 5,601,165
DATED : February 11, 1997
INVENTOR(S) : Horst OPPITZ, Stefan SCHIFFLER and Bernhard SCHMITT It is certified that error appears in the above-indentified patent and that said Letters Patent is hereby corrected as shown below:

In column 5, line 53, after 'are', delete "preferable" and insert --preferably--.

In column 6, line 20, after 'stabilizer', delete "1a, 1b" and insert --1a', 1b'--.

In column 6, line 21, after ' 1b" ', delete "here" and insert --there--.

In column 7, line 19, before 'consists', delete " 33" " and insert --33'--.

In column 9, line 33, Claim 7, after the first occurrence of 'said', delete "s haft" and insert --shaft--.

In column 11, line 12, Claim 17, after 'range', delete "for" and insert --of--.

Signed and Sealed this

Twenty-ninth Day of July, 1997

Attest:

BRUCE LEHMAN

Attesting Officer

Commissioner of Patents and Trademarks